(12) United States Patent
Tsuji

(10) Patent No.: US 10,306,133 B2
(45) Date of Patent: May 28, 2019

(54) IMAGE PROCESSING APPARATUS FOR GENERATING A LIKELIHOOD DISTRIBUTION OF AN OBJECT

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/625,928

(22) Filed: Jun. 16, 2017

(65) Prior Publication Data

US 2017/0374272 A1 Dec. 28, 2017

(30) Foreign Application Priority Data

Jun. 22, 2016 (JP) .................. 2016-123608

(51) Int. Cl.
| | | |
|---|---|---|
| H04N 5/232 | (2006.01) | |
| G06T 7/593 | (2017.01) | |
| G06T 7/73 | (2017.01) | |
| G06T 7/11 | (2017.01) | |
| G06T 7/246 | (2017.01) | |
| G06T 7/174 | (2017.01) | |

(52) U.S. Cl.
CPC .......... *H04N 5/23212* (2013.01); *G06T 7/11* (2017.01); *G06T 7/174* (2017.01); *G06T 7/248* (2017.01); *G06T 7/593* (2017.01); *G06T 7/73* (2017.01); *H04N 5/23229* (2013.01); *G06T 2207/10012* (2013.01); *G06T 2207/10028* (2013.01); *G06T 2207/20228* (2013.01); *G06T 2207/30196* (2013.01); *G06T 2207/30241* (2013.01)

(58) Field of Classification Search
CPC .................. H04N 5/23212; G06T 2207/10012
See application file for complete search history.

(56) References Cited

U.S. PATENT DOCUMENTS

| | | | |
|---|---|---|---|
| 2013/0250109 A1* | 9/2013 | Yokota | ................. H04N 5/2254 348/148 |
| 2014/0119604 A1 | 5/2014 | Mai | |
| 2015/0055829 A1 | 2/2015 | Liang | |
| 2016/0086050 A1 | 3/2016 | Piekniewski | |

FOREIGN PATENT DOCUMENTS

| | | |
|---|---|---|
| JP | 2001-60269 A | 3/2001 |
| JP | 2005-318554 A | 11/2005 |
| JP | 2008-15754 A | 1/2008 |

* cited by examiner

*Primary Examiner* — Christopher K Peterson
(74) *Attorney, Agent, or Firm* — Canon U.S.A., Inc. IP Division

(57) ABSTRACT

One aspect of the present invention provides an image processing apparatus capable of tracking an image region to be tracked with high accuracy.

A distance distribution generation unit generates distance information indicating a distance of each of regions in first image data. An object likelihood distribution generation unit generates a likelihood distribution of an object in the first image data based on information indicating a position specified as the object in the first image data, the distance information, and reliability of the distance information. A feature amount extraction unit calculates a feature amount to be used to detect the object from second image data based on the likelihood distribution.

14 Claims, 8 Drawing Sheets

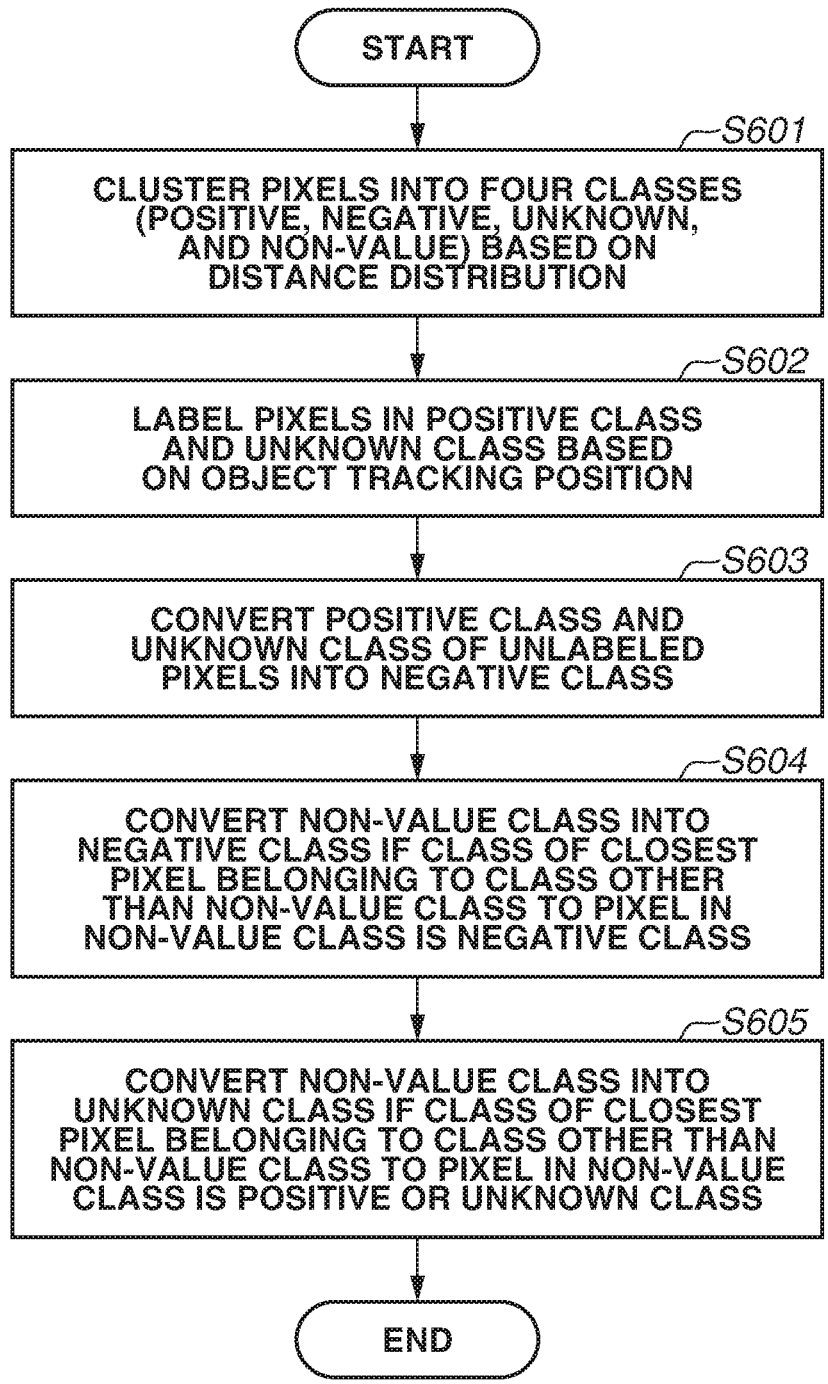

FIG.7A

| PRESENCE OR ABSENCE OF DISTANCE INFORMATION | RELIABILITY OF DISTANCE INFORMATION | VALUE OF DISTANCE INFORMATION | CLASS IN STEP S601 |
|---|---|---|---|
| PRESENT | HIGH | CLOSE | POSITIVE |
| | | FAR | NEGATIVE |
| | LOW | — | UNKNOUWN |
| ABSENT | — | — | NON-VALUE |

FIG.7B

| CLASS IN OBJECT LIKELIHOOD DISTRIBUTION | DEFINITION |
|---|---|
| POSITIVE | PROBABILITY OF BEING OBJECT IS HIGH |
| NEGATIVE | PROBABILITY OF BEING OBJECT IS LOW |
| UNKNOUWN | PROBABILITY OF BEING OBJECT CANNOT BE DETERMINED |

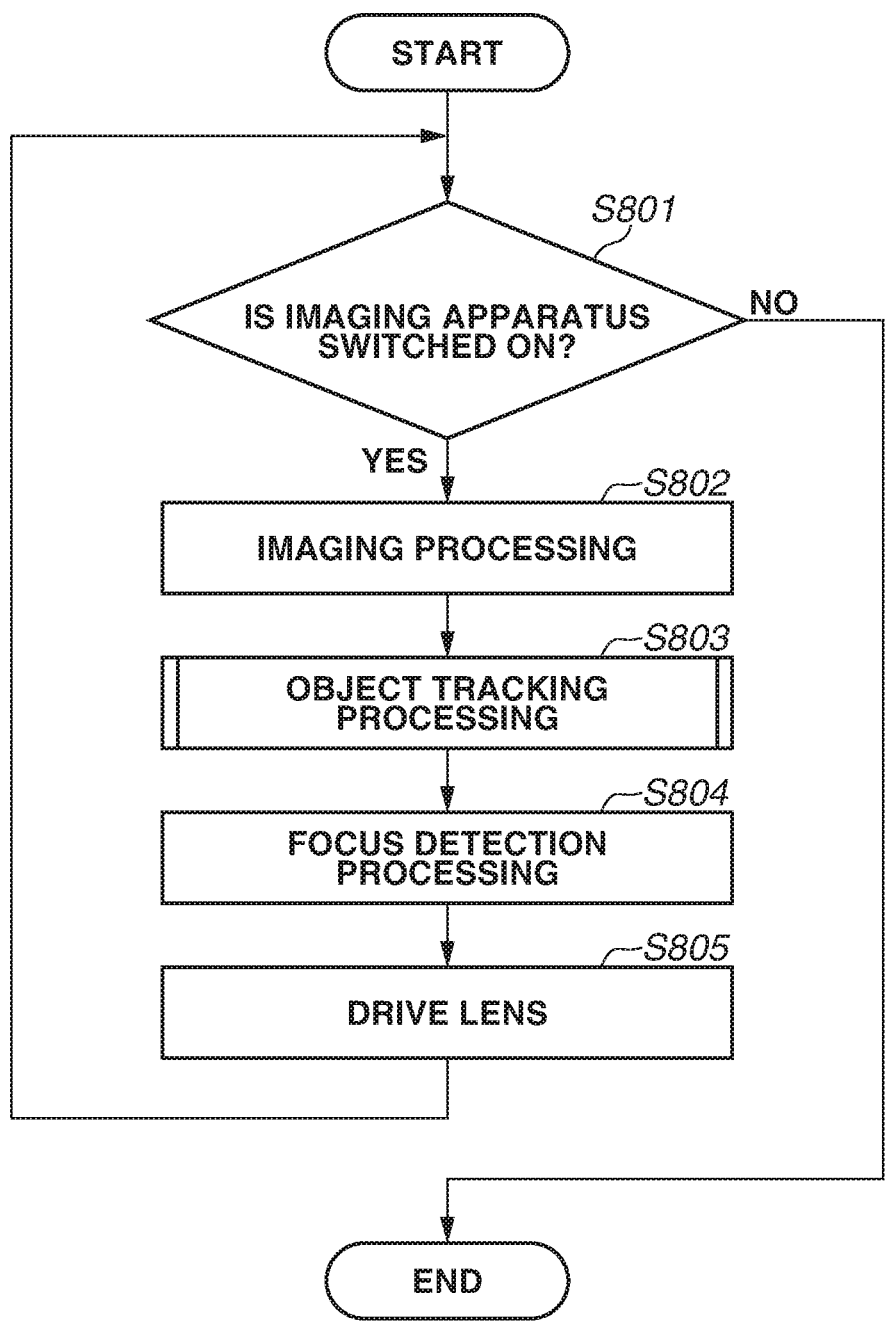

IMAGE PROCESSING APPARATUS FOR GENERATING A LIKELIHOOD DISTRIBUTION OF AN OBJECT

BACKGROUND OF THE INVENTION

Field of the Invention

The present invention relates to an image processing apparatus, an imaging apparatus, and an image processing method that track an image region to be tracked.

Description of the Related Art

One of very useful techniques is a technique of extracting an image region of a specific object (hereinbelow referred to as an object region) from an image supplied in a time-series manner and tracking the extracted object region in each time-series image, and the technique is used to track, for example, a human face region and a human body region in a moving image. Such a technique can be used in a wide variety of areas, such as a telecommunication meeting, a man-machine interface, security, a monitoring system for tracking an arbitrary object, and an image compression.

Further, Japanese Patent Application Laid-Open No. 2005-318554 and Japanese Patent Application Laid-Open No. 2001-60269 each discuss a technique of, when an arbitrary object region in a captured image is specified with use of a touch panel or the like, extracting and tracking the object region and optimizing a focus state and/or an exposure state with respect to the object region. For example, Japanese Patent Application Laid-Open No. 2005-318554 discusses an imaging apparatus that detects (extracts) and tracks a position of a face from the captured image to focus on the face and also capture an image with an optimum exposure. Further, Japanese Patent Application Laid-Open No. 2001-60269 discusses an object tracking apparatus that automatically tracks a specific object with use of template matching. When the arbitrary image region contained in the captured image is specified with use of an input interface, such as the touch panel, the object tracking apparatus discussed in Japanese Patent Application Laid-Open No. 2001-60269 registers the image region as a template image. Then, the object tracking apparatus estimates an image region having a highest similarity to or a smallest difference from the template image in a captured image, and tracks this image region as the object region to be tracked.

In a region-based tracking method like the above-described template matching, a setting of the image region to be tracked (the template image) largely affects tracking accuracy. For example, if an image region smaller than an appropriately sized region is used as the template image, a feature amount required to estimate the object region to be tracked is insufficient, making accurate tracking impossible. If an image region larger than the appropriately sized region is used as the template image, an element other than the object, such as a background, may be included in the template image, and the background region may be incorrectly tracked in this case.

One conceivable method is, for example, to refer to information about a distance from the camera to the object in addition to the image information, thereby preventing the element other than the object, such as the background, from being contained in the template image. However, in such a case that a plurality of objects is located substantially equal distances away from the camera, the apparatus may incorrectly track another image region (another object region) different from the object region that should be tracked. In a case where the image region to be tracked is an image having such a pattern that it is difficult to detect the distance information, it is difficult to acquire accurate distance information, reducing the accuracy of the detection of the object region to be tracked. For example, the distance information may be calculated only with respect to a partial image region in the captured image to reduce a processing load, and the accurate tracking is impossible.

SUMMARY OF THE INVENTION

According to an aspect of the present invention, an image processing apparatus includes an acquisition unit configured to acquire distance information indicating a distance of each of regions in first image data, a generation unit configured to generate a likelihood distribution of an object in the first image data based on information indicating a position specified as the object in the first image data, the distance information, and reliability of the distance information, and a calculation unit configured to calculate a feature amount to be used to detect the object from second image data based on the likelihood distribution.

According to another aspect of the present invention, an image processing apparatus includes an acquisition unit configured to calculate a defocus amount of each of regions in first image data from a plurality of pieces of image data corresponding to the first image data and having a parallax to acquire distance information from the defocus amount of each of the regions, a generation unit configured to generate a likelihood distribution of an object in the first image data based on information indicating a position specified as the object in the first image data and the distance information, and a calculation unit configured to calculate a feature amount to be used to detect the object from second image data based on the likelihood distribution.

Further features of the present invention will become apparent from the following description of exemplary embodiments with reference to the attached drawings.

BRIEF DESCRIPTION OF THE DRAWINGS

FIG. 4B illustrates a range where an object region to be tracked is searched for.

FIG. 6 is a flowchart illustrating steps of generating the object likelihood distribution.

FIG. 7A illustrates clustering using distance information, and FIG. 7B illustrates classes in the object likelihood distribution.

FIG. 8 is a flowchart illustrating steps of imaging processing.

DESCRIPTION OF THE EMBODIMENTS

An exemplary embodiment of the present invention is described with reference to the accompanying drawings.

A tracking apparatus according to the present exemplary embodiment can be applied to a digital still camera, a video camera, and the like that can record data of a moving image and a still image formed by imaging an object into various types of recording media, such as a magnetic tape, a solid-state memory, an optical disk, and a magnetic disk. Besides them, the tracking apparatus according to the present exemplary embodiment can also be applied to various types of portable terminals, such as a smart-phone and a tablet terminal equipped with a camera function, various types of imaging apparatuses, such as a camera for industrial use, an in-vehicle camera, and a camera for medical use, and display apparatuses that displays a moving image and the like.

<Schematic Configuration of Imaging Apparatus>

Figure 1:
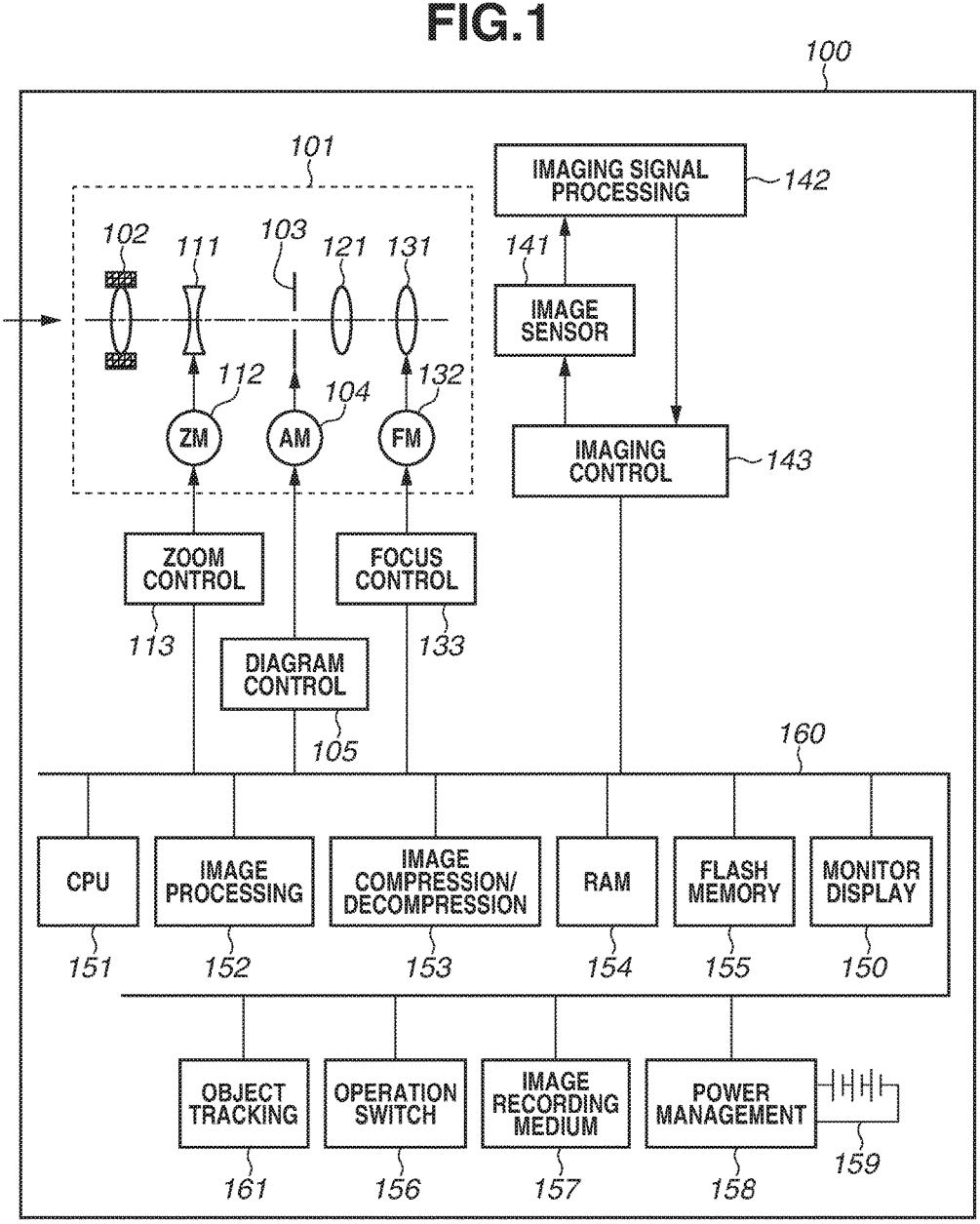
FIG. 1 schematically illustrates a configuration of an imaging apparatus according to an exemplary embodiment.

A schematic configuration of an imaging apparatus 100 as one example of the application of the tracking apparatus according to the present exemplary embodiment is described with reference to FIG. 1.

As described in detail below, the imaging apparatus 100 according to the present exemplary embodiment has an object tracking function of extracting an image region of a specific object (an object region) from an image sequentially supplied in a time-series manner and tracking the object region as a target of the tracking. When tracking the specific object region, the imaging apparatus 100 according to the present exemplary embodiment estimates a distance from the imaging apparatus 100 to the object with use of parallax images described below, and estimates the specific object region based on information about the estimated distance.

Each of units in the imaging apparatus 100 is connected via a bus 160. Each of the units is controlled by a central processing unit (CPU) 151. A lens unit 101 of the imaging apparatus 100 includes a fixed first-group lens 102, a zoom lens 111, a diaphragm 103, a fixed third-group lens 121, and a focus lens 131. A diaphragm control circuit 105 adjusts an aperture diameter of the diaphragm 103 to adjust a light amount at the time of the imaging by driving the diaphragm 103 via a diaphragm motor 104 (AM) according to an instruction from the CPU 151. A zoom control circuit 113 changes a focal length by driving the zoom lens 111 via a zoom motor 112 (ZM). A focus control circuit 133 carries out a focus adjustment by determining a driving amount by which a focus motor 132 (FM) is driven based on an amount of shift in a focusing direction of the lens unit 101 and driving the focus lens 131 via the focus motor 132 according to the driving amount. In this manner, the focus control circuit 133 performs autofocus (AF) control by controlling a movement of the focus lens 131 via the focus motor 132 based on the amount of shift in the focusing direction of the lens unit 101. The focus lens 131 is a lens for the focus adjustment, and is simply illustrated as a single lens in FIG. 1 but generally includes a plurality of lenses. An optical image of the object, a background, and the like is formed on an imaging plane of an image sensor 141 by the lens unit 101 configured in this manner.

The image sensor 141 photoelectrically converts the optical image of the object, the background, and the like formed on the imaging plane into an electric signal. An imaging operation of the image sensor 141 is controlled by an imaging control circuit 143. The image sensor 141 includes an array of a plurality of pixels capable of generating the parallax images by a plurality of photoelectric conversion elements (first and second photoelectric conversion elements in the present exemplary embodiment) configured to share one micro lens. More specifically, in the image senor 141, the first and second photoelectric conversion elements (a light-receiving area) are disposed in each of the m×n pixels, m pixels arrayed in a horizontal direction and n pixels arrayed in a vertical direction. An image signal into which the optical image is photoelectrically converted after being formed on the imaging plane of the image sensor 141 is transmitted to an imaging signal processing circuit 142. A known technique discussed in, for example, Japanese Patent Application Laid-Open No. 2008-15754 can be employed for the configuration and the optical principle of the image sensor 141 arranged in this manner.

The imaging signal processing circuit 142 acquires the image signal (captured image data) corresponding to the optical image formed on the imaging plane by adding outputs of the first and second photoelectric conversion elements for each of the pixels. The imaging signal processing circuit 142 acquires signals of two images (the parallax images) having parallax by individually handling the outputs of the first and second photoelectric conversion elements for each of the pixels. In the description of the present exemplary embodiment, the captured image acquired by adding the outputs of the first and second photoelectric conversion elements for each of the pixels will be referred to as an "A+B image", and the parallax images respectively acquired by individually handling the outputs of the two photoelectric conversion elements for each of the pixels will be referred to as an "A image" and a "B image". The image sensor 141 according to the present exemplary embodiment includes the first and second photoelectric conversion elements arrayed so as to be lined in a transverse direction (the horizontal direction), and therefore the A image and the B image are images having parallax in the horizontal direction. Captured image data of the A+B image and parallax image data of the A image and the B image that are output from the imaging signal processing circuit 142 are transmitted to a random access memory (RAM) 154 via the imaging control circuit 143 and are temporarily stored in the RAM 154. If the imaging apparatus 100 is capturing a moving image or continuously capturing a still image every time a predetermined time interval elapses, the captured image data of the A+B image and the parallax image data of the A image and the B image are sequentially output and stored into the RAM 154 from the imaging signal processing circuit 142.

The captured image data of the A+B image of the image data stored in the RAM 154 is transmitted to an image processing circuit 152. The image processing circuit 152 performs various kinds of image processing, such as a gamma correction and white balance processing, on the captured image data read out from the RAM 154. The image processing circuit 152 also performs processing for reducing or enlarging the processed image data into an optimum size for displaying the image data on a monitor display 150. The image data sized into the optimum size by the reduction/enlargement processing is transmitted to the monitor display 150 and an image thereof is displayed thereon. An operator of the imaging apparatus 100 (hereinbelow referred to as a user) can observe the captured image in real time by viewing the image displayed on the monitor display 150. If the imaging apparatus 100 according to the present exemplary embodiment is set to display the captured image on a screen of the monitor display 150 only for a predetermined time period immediately after the image is captured, the user can confirm this captured image immediately after the image is captured. The captured image data of the A+B image stored in the RAM 154 is also transmitted to an image compression/decompression circuit 153. The image compression/decompression circuit 153 compresses the captured image data read out from the RAM 154, and after that, transmits the compressed image data to an image recording medium 157 serving as a recording medium. The image recording medium 157 records the compressed image data.

The parallax image data of the A image and the B image of the image data stored in the RAM 154 is transmitted to the focus control circuit 133. The focus control circuit 133 performs the AF control by acquiring the shift amount in the focusing direction of the lens unit 101 from the parallax images of the A image and the B image and driving the focus lens 131 via the focus motor 132 so as to eliminate the shift in the focusing direction.

An operation switch 156 is an input interface including a touch panel, various kinds of buttons and switches. The buttons and the switches are provided in a housing or the like of the imaging apparatus 100, and the touch panel is disposed on a display surface of the monitor display 150. The imaging apparatus 100 according to the present exemplary embodiment can display various functional icons on the screen of the monitor display 150, and these various functional icons are selected and operated by the user via the touch panel. Operation information input by the user via the operation switch 156 is transmitted to the CPU 151 via the bus 160.

When the operation information is input by the user via the operation switch 156, the CPU 151 controls each of the units based on the operation information. When the image sensor 141 captures the image, the CPU 151 determines a time period during which the image sensor 141 accumulates electric charges, a setting value of a gain when the image data is output from the image sensor 141 to the imaging signal processing circuit 142, and the like. More specifically, the CPU 151 determines the accumulation time period of the image sensor 141, the setting value of the output gain, and the like based on an instruction according to the operation information input by the user via the operation switch 156 or a size of a pixel value of the image data temporarily stored in the RAM 154. The imaging control circuit 143 receives instructions indicating the accumulation time period and the setting value of the gain from the CPU 151, and controls the image sensor 141 according to these instructions.

A battery 159 is appropriately managed by a power management circuit 158, and stably supplies power to the entire imaging apparatus 100. A flash memory 155 stores a control program required for the operation of the imaging apparatus 100 therein. When the imaging apparatus 100 is started up according to the user's operation (when the imaging apparatus 100 shifts from a power-off state to a power-on state), the control program stored in the flash memory 155 is read (loaded) into a part of the RAM 154. As a result, the CPU 151 controls the operation of the imaging apparatus 100 according to the control program loaded in the RAM 154.

In the imaging apparatus 100 according to the present exemplary embodiment, the captured image data of the A+B image and the parallax image data of the A image and the B image that are stored in the RAM 154 are also transmitted to an object tracking circuit 161. The object tracking circuit 161 is a unit corresponding to the tracking apparatus according to the present exemplary embodiment. In the following description, the captured image data of the A+B image that is input to the object tracking circuit 161 will be referred to as input image data. As described in detail below, the object tracking circuit 161 tracks the specific object region while extracting and outputting this tracked specific object region from the input image of the A+B image read out from the RAM 154 and sequentially input in a time-series manner. As described in detail below, the object tracking circuit 161 estimates the distance from the imaging apparatus 100 to the object or the like based on the parallax images of the A image and the B image, and uses the distance information when tracking the specific object region.

Information indicating a result of the object tracking by the object tracking circuit 161, i.e., information about the tracked and extracted specific object region, is transmitted to each of the units such as the focus control circuit 133, the diaphragm control circuit 105, the image processing circuit 152, and the CPU 151 via the bus 160. Under such an imaging condition that the object corresponding to the tracked specific object region is set as a target for the AF control, the focus control circuit 133 performs the AF control so as to bring the object into focus. The diaphragm control circuit 105 uses a luminance value of the tracked specific object region to perform an exposure control under such an imaging condition that the object region can be imaged with an appropriate brightness. The image processing circuit 152 performs such image processing that the specific object region is subjected to an optimum gamma correction and optimum white balance processing. The CPU 151 performs such display control that a rectangular image, for example, surrounding the tracked specific object region is displayed while being superimposed on the captured image displayed on the screen of the monitor display 150.

<Schematic Configuration of Object Tracking Circuit>

Figure 2:
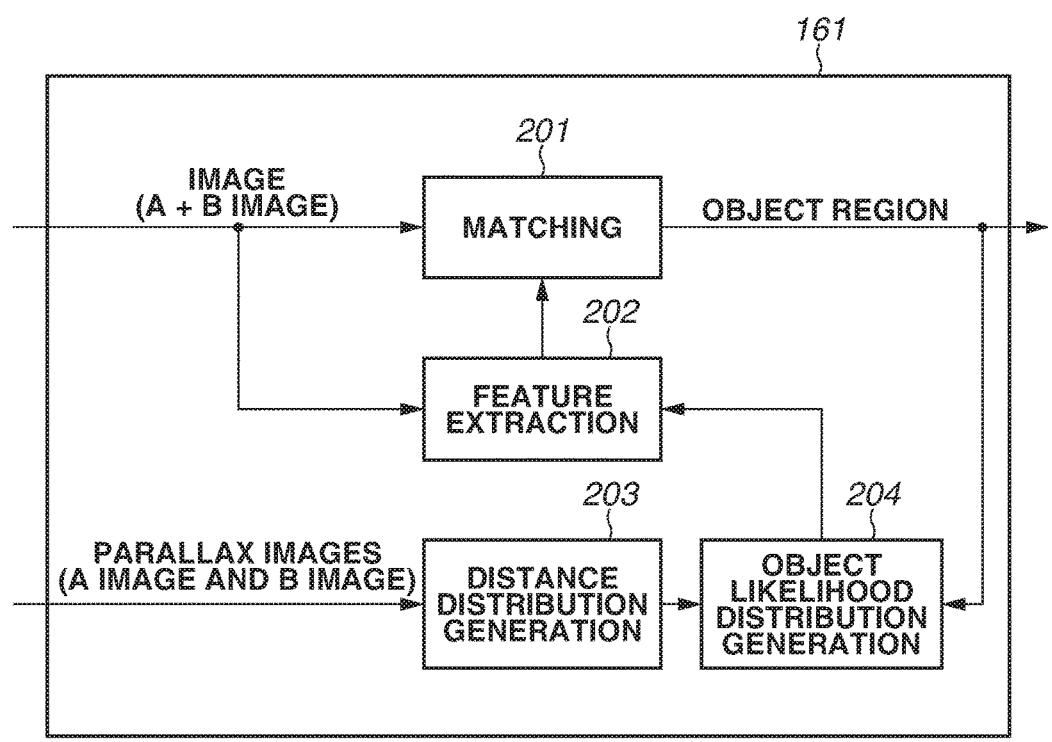
FIG. 2 schematically illustrates a configuration of an object tracking unit.

A configuration and an operation of the object tracking circuit 161 according to the present exemplary embodiment are described. FIG. 2 illustrates a schematic configuration of the object tracking circuit 161.

The object tracking circuit 161 illustrated in FIG. 2 includes a matching circuit 201, a feature extraction circuit 202, a distance distribution generation circuit 203, and an object likelihood distribution generation circuit 204. In the following description, the object likelihood distribution generation circuit 204 is referred to as the likelihood distribution generation circuit 204 to simplify the description. The feature extraction circuit 202 and the matching circuit 201 are one example of an estimation unit according to the present exemplary embodiment. The input image data of the A+B image and the parallax image data of the A image and the B image that are sequentially read out and supplied from the RAM 154 are transmitted to the matching circuit 201 and the feature extraction circuit 202 and to the distance distribution generation circuit 203, respectively.

The feature extraction circuit 202 is one example of a calculation unit, and extracts a feature amount of the object region to be tracked from the input image data of the A+B image based on information about an object likelihood distribution supplied from the likelihood distribution generation circuit 204 to be described below, and transmits information about the feature amount to the matching circuit 201. In the present exemplary embodiment, the object region to be tracked is, for example, an image region corresponding to a specific object specified by the user on the captured image displayed on the screen of the monitor display 150. The matching circuit 201 estimates the object region to be tracked by performing matching processing on the input image of the A+B image with use of the feature amount of the object region extracted by the feature extraction circuit 202. This object region estimated by the matching circuit 201 is the specific object region to be tracked in the input image of the A+B image sequentially input to the object tracking circuit 161. Details of the processing for extracting the feature amount by the feature extraction circuit 202 and the matching processing by the matching circuit 201 are described below.

The distance distribution generation circuit 203 is one example of an acquisition unit according to the present exemplary embodiment, and calculates the distance from the imaging apparatus 100 to the object or the like with respect to a predetermined region in the input image of the A+B image based on the parallax images of the A image and the B image and generates a distance distribution from the distance information. In the case of the present exemplary embodiment, the predetermined region is, for example, a region corresponding to each of the pixels in the input image of the A+B image. Therefore, the distance distribution generation circuit 203 calculates each piece of distance information corresponding to one of the pixels in the input image of the A+B image with use of the parallax images of the A image and the B image, and generates the distance distribution indicating a distribution of the pieces of distance information about these individual pixels. The predetermined region may be a region of a small block obtained by dividing the input image into a plurality of blocks. Details of the processing for generating the distance distribution is described below. The distance distribution information generated by the distance distribution generation circuit 203 is transmitted to the likelihood distribution generation circuit 204.

The likelihood distribution generation circuit 204 is one example of a generation unit, and information indicating the specific object region extracted by the matching circuit 201 is also supplied to the likelihood distribution generation circuit 204. The likelihood distribution generation circuit 204 generates the object likelihood distribution indicating a distribution of probabilities that the image region to be tracked is the specific object region based on the distance distribution information from the distance distribution generation circuit 203 and the information about the object region from the matching circuit 201. Details of the processing in which the likelihood distribution generation circuit 204 generates the object likelihood distribution based on the distance distribution information and the information about the object region is described below. Information about the object likelihood distribution generated by the likelihood distribution generation circuit 204 is transmitted to the feature extraction circuit 202.

The feature extraction circuit 202 estimates the object region to be tracked from the input image of the A+B image with use of the information about the object likelihood distribution, and extracts the feature amount of the estimated object region. Details of the processing for estimating the object region with use of the object likelihood distribution and extracting the feature amount are described below. In the case of the present exemplary embodiment, the feature extraction circuit 202 can extract the feature amount of the object region with high accuracy by using the information about the object likelihood distribution when estimating the object region to be tracked.

The circuit configuration of the object tracking circuit 161 is described, but the CPU 151 may perform software processing that realizes a function similar to the object tracking circuit 161, instead of the object tracking circuit 161.

<Flow of Object Tracking Processing>

Figure 3:
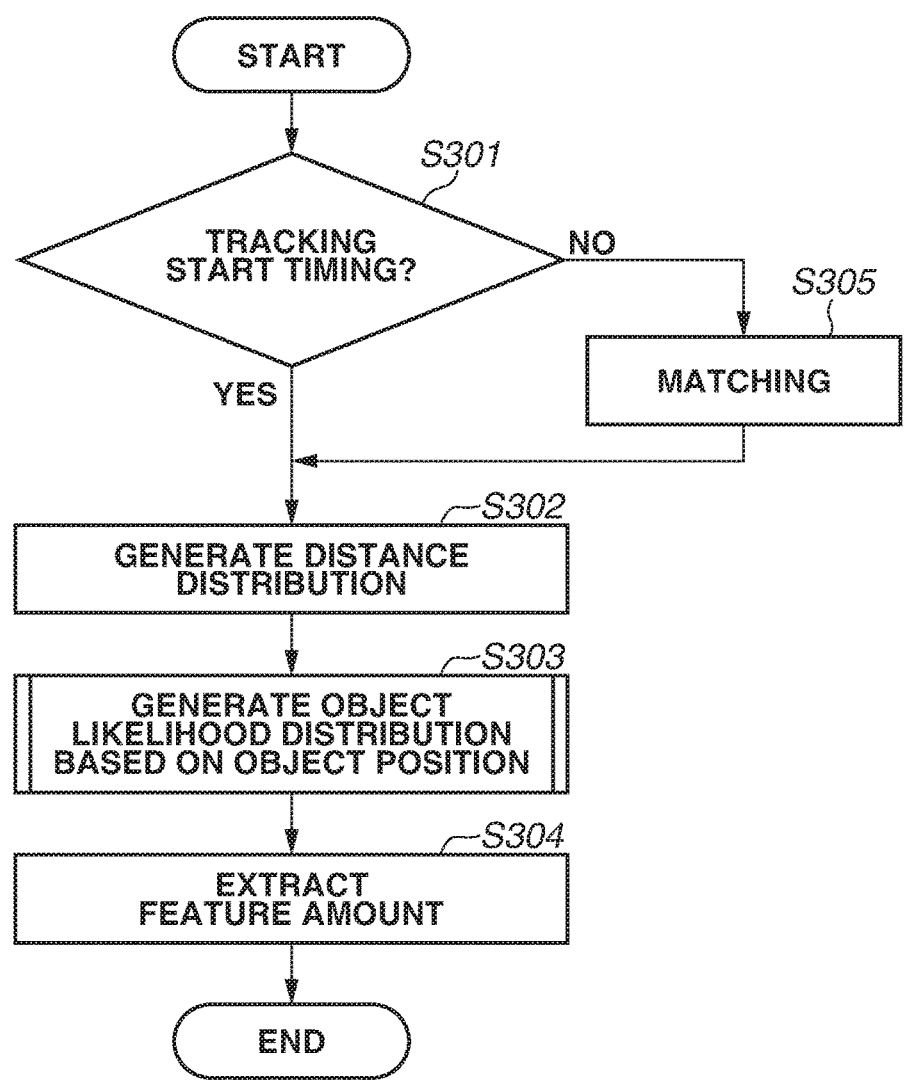
FIG. 3 is a flowchart illustrating steps of object tracking processing.

FIG. 3 is a flowchart illustrating a flow of the object tracking processing performed by the imaging apparatus 100 according to the present exemplary embodiment. The processing illustrated in the flowchart of FIG. 3 starts when the imaging is started at the imaging apparatus 100. Each of processing steps illustrated in the flowchart of FIG. 3 may be realized by, for example, the CPU 151 executing a program according to the present exemplary embodiment.

In step S301 illustrated in the flowchart of FIG. 3, the CPU 151 determines whether a tracking start timing has come. In the present exemplary embodiment, the tracking start timing is, for example, a timing at which the user performs an operation of giving an instruction to start tracking the object via the touch panel of the operation switch 156. In the present exemplary embodiment, the user's operation of giving the instruction to start tracking the object is a position specifying operation that, for example, the user touches a position of a desired object on the image displayed on the screen of the monitor display 150. If the CPU 151 determines that the tracking start timing has come in step S301 (YES in step S301), the processing proceeds to step S302. If the CPU 151 determines that the current timing is not the tracking start timing and the object tracking processing is already ongoing in step S301 (NO in step S301), the processing proceeds to step S305. Steps S302 and S305 and steps subsequent thereto illustrated in the flowchart of FIG. 3 are processing performed by the object tracking circuit 161.

The description of the present flowchart starts with processing performed by the object tracking circuit 161 when the CPU 151 determines that the tracking start timing has come in step S301 and the processing proceeds to processing in step S302 and the steps subsequent thereto.

In step S302, the distance distribution generation circuit 203 of the object tracking circuit 161 calculates the distance from the imaging apparatus 100 to the object or the like with respect to each of the pixels in the input image of the A+B image based on the parallax images of the A image and the B image, and generates the distance distribution from the distance information. In the case where the predetermined region is, for example, the region of the small block obtained by dividing the input image into the plurality of blocks, the distance distribution generation circuit 203 generates the distance distribution from the distance information about each of these small blocks. After step S302, the processing performed by the object tracking circuit 161 proceeds to processing in step S303 that is performed by the likelihood distribution generation circuit 204.

In step S303, the likelihood distribution generation circuit 204 generates the object likelihood distribution based on the information about the distance distribution supplied from the distance distribution generation circuit 203 and information about an object tracking position. The object tracking position at the tracking start timing is a position when the user, for example, touches the desired object region in the image displayed on the screen of the monitor display 150 at the tracking start timing. In the case of the present exemplary embodiment, the operation information when the user touches the screen on the monitor display 150 is transmitted from the touch panel to the CPU 151, and the CPU 151 generates the information about the object tracking position based on the operation information and notifies the object tracking circuit 161. In the example illustrated in FIG. 2, the information about the object tracking position that the object tracking circuit 161 is notified of by the CPU 151 is omitted from the illustration. Details of the processing for generating the object likelihood distribution based on the distance distribution and the object tracking position in step S303 are described below. After step S303, the processing performed by the object tracking circuit 161 proceeds to processing in step S304 that is performed by the feature extraction circuit 202.

In step S304, the feature extraction circuit 202 of the object tracking circuit 161 estimates the object region to be tracked with use of the object likelihood distribution generated in step S303, and, for example, color information about the input image of the A+B image, and extracts the feature amount of the estimated object region. Upon completion of the processing for extracting the feature amount in step S304, the object tracking circuit 161 ends the processing illustrated in the flowchart of FIG. 3.

Description is provided about processing performed by the object tracking circuit 161 when the CPU 151 determines that the current timing is not the tracking start timing and the object tracking is ongoing in step S301 and the processing proceeds to processing in step S305 and the steps subsequent thereto.

In step S305, the matching circuit 201 of the object tracking circuit 161 estimates the specific object region from each input image of the A+B image read out from the RAM 154 and sequentially input, and sequentially outputs data indicating the object region. After step S305, the processing performed by the object tracking circuit 161 proceeds to the processing in steps 302 to S304 and steps subsequent thereto. The processing in steps S305 to S304 is performed every time each input image of the A+B image is read out from the RAM 154 and sequentially input.

If the processing proceeds from step S305 to step S302, in step S302, the distance distribution generation circuit 203 acquires the distance information about each of the pixels in the input image of the A+B image based on the parallax images of the A image and the B image, and generates the distance distribution, in a similar manner to the above description.

In step S303, the likelihood distribution generation circuit 204 generates the object likelihood distribution based on the information about the distance distribution supplied from the distance distribution generation circuit 203 and the information about the object tracking position. However, a position of the object region extracted in the matching processing performed by the matching circuit 201 is used as the object tracking position when the object tracking is already ongoing. In other words, the object tracking position in step S303 is sequentially updated to the position based on the object region estimated in step S305. The likelihood distribution generation circuit 204 transmits the information about the object likelihood distribution generated with use of the positional information about the object region extracted by the matching circuit 201 and the information about the above-described distance distribution to the feature extraction circuit 202. In step S304, the feature extraction circuit 202 extracts the feature amount in a similar manner to the above description.

As described above, if the CPU 151 determines that the current timing is not the tracking start timing and the object tracking is ongoing in step S301 and the processing proceeds to the processing in step S305 and the steps subsequent thereto, the processing performed by the object tracking circuit 161 proceeds to steps S302 to S304 every time the specific object region is extracted in step S305. Each of the distance distribution acquired by the distance distribution generation circuit 203 in step S302, the object likelihood distribution acquired by the likelihood distribution generation circuit 204 in step S303, and the feature amount acquired by the feature extraction circuit 202 in step S304 is sequentially updated. Upon completion of the processing for extracting the feature amount in step S304, the object tracking circuit 161 ends the processing illustrated in the flowchart of FIG. 3.

The object tracking unit 161 may be configured to track the object from each input image with use of the feature amount acquired based on the object region extracted from the first input image (a reference image) without updating the feature amount by performing the processing in steps S302 to S304 on each sequentially supplied input image, after the object region is extracted at the tracking start timing. In this case, the distance distribution generation circuit 203 generates the distance distribution indicating the distance of each of the pixels in the reference image. The likelihood distribution generation circuit 204 generates the object likelihood distribution indicating the probability as the object in the reference image based on the distance to the position specified as the object to be tracked in the reference image and the distance distribution. The feature extraction circuit 202 estimates the image region corresponding to the object from the reference image based on the object likelihood distribution, and calculates the feature amount to be used for tracking the object with use of the image region as a template. Even in this case, the imaging apparatus 100 extracts the object region based on the information about the object likelihood distribution when extracting the feature amount in the reference image, and therefore can track the image region to be tracked with high accuracy.

<Details of Matching Circuit of Object Tracking Circuit>

The details of the processing performed by the matching circuit 201 of the object tracking circuit 161 are described. The matching circuit 201 estimates the object region to be tracked and extracts the object region from each input image of the A+B image sequentially supplied from the RAM 154 with use of the feature amount extracted by the feature extraction circuit 202. The matching circuit 201 estimates the object region by carrying out matching regarding the feature amount of a partial region in the input image of the A+B image. There is a wide variety of feature amount matching methods. In the present exemplary embodiment, the matching processing is described citing an example that uses a matching method according to template matching based on a similarity of a pixel pattern by way of example.

Figure 4A:
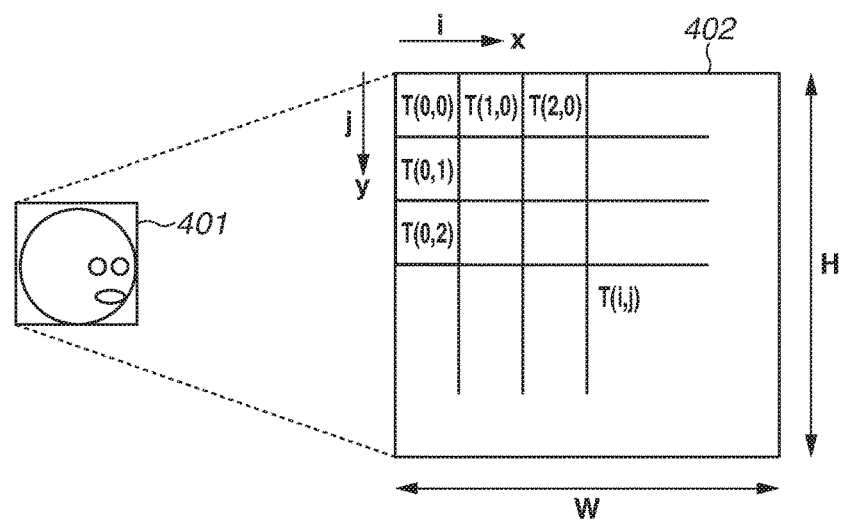
FIG. 4A illustrates an example of an object model used in template matching.

Details of the template matching carried out by the matching circuit 201 are described with reference to FIGS. 4A and 4B. FIG. 4A illustrates an example of an object model (a template) used in the template matching. An image 401 illustrated in FIG. 4A is an image example of an image region (the object region) registered as a template image, and an image of the image region at the position specified by the user at the above-described tracking start timing in the case of the present exemplary embodiment. In the present exemplary embodiment, a pixel pattern expressed by the feature amount of each of pixels in the image 401 is handled as the object model (hereinafter referred to as a template 402). The template 402 illustrated in FIG. 4A is patterned in a grid-like manner having squares each corresponding to one of the pixels, and is arranged so as to have a size of the number of pixels W in the horizontal direction and the number of pixels H in the vertical direction. (i, j) in each of the pixels in the template 402 represent (x, y) coordinates in the template 402, and T(i, j) represents the feature amount of each of the pixels. In the present exemplary embodiment, a luminance value of each of the pixels is used as the feature amount T(i, j) in the template 402. In the present exemplary embodiment, the feature amount T(i, j) of each of the pixels in the template 402 is expressed by the following equation (1).

$$T(i,j) = \{T(0,0), T(1,0), \ldots, T(W-1, H-1)\} \quad \text{Equation (1)}$$

Figure 4B:
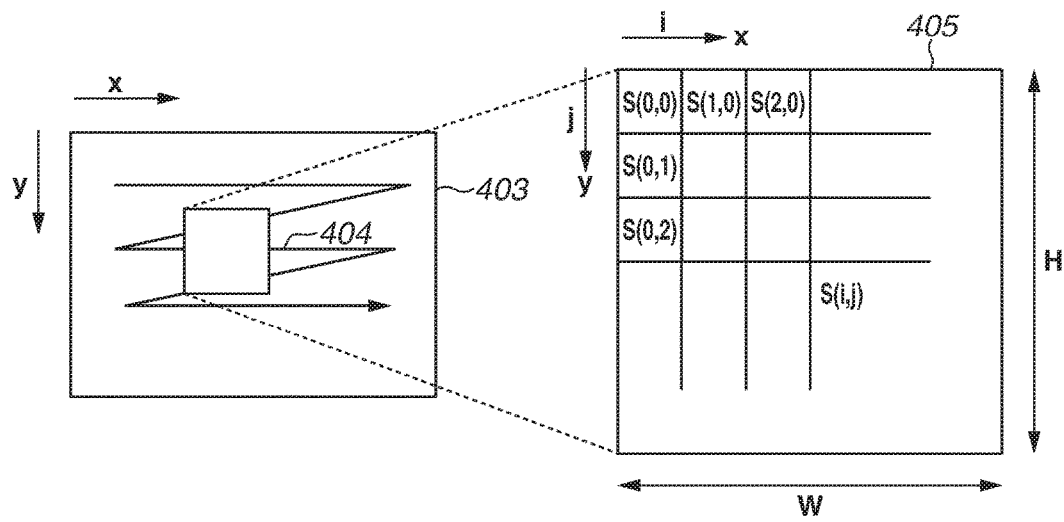

An image 403 illustrated in FIG. 4B indicates a range where the object region to be tracked is searched for, i.e., the input image of the A+B image. The matching circuit 201 sets a partial region 404 in a raster order as indicated by an arrow in FIG. 4B, i.e., sequentially sets the partial region 404 while shifting the partial region 404 one pixel by one pixel in order starting from an upper left corner in FIG. 4B within a range of the input image 403. A size of the partial region 404 corresponds to the size of the template 402. The matching circuit 201 handles the feature amount of each of pixels contained in this partial region 404 as a pixel pattern 405. In FIG. 4B, the pixel pattern 405 expressed by the feature amount of each of the pixels in the partial region 404 is patterned in a grid-like manner having squares each corresponding to each of the pixels, and is arranged so as to have the size of the number of pixels W in the horizontal direction and the number of pixels H in the vertical direction. (i, j) in each of the pixels in the pixel pattern 405 represent (x, y) coordinates in the partial region 404, and S(i, j) represents the feature amount of each of the pixels. A luminance value of each of the pixels is used as the feature amount in the pixel pattern 405 of the partial region 404. In the present exemplary embodiment, the feature amount S(i, j) of each of the pixels in the pixel pattern 405 of the partial region 404 is expressed by the following equation (2).

$$S(i,j) = \{S(0,0), S(1,0), \ldots, S(W-1, H-1)\} \quad \text{Equation (2)}$$

The matching circuit 201 sequentially performs the matching processing between the pixel pattern 405 of each of the partial regions 404 set in the raster order as illustrated in FIG. 4B and the template 402 illustrated in FIG. 4A, thereby evaluating a similarity therebetween. The matching circuit 201 generates an evaluation value of the similarity acquired for each of the partial regions 404 set in the raster order from the input image of the A+B image as a template evaluation value.

A sum of absolute values of differences, i.e., a so-called Sum of Absolute Difference (SAD) value can be used as a calculation method for evaluating the similarity between the template 402 and the partial region 404 (the pixel pattern 405) by way of example. The SAD value (the sum of absolute values of differences) V(x, y) is calculated by the following equation (3).

$$V(x, y) = \sum_{y=0}^{H-1} \sum_{x=0}^{W-1} |T(i, j) - S(i, j)| \quad \text{Equation (3)}$$

As described above, the matching circuit 201 sequentially sets the partial region 404 while shifting the partial region 404 one pixel by one pixel in the raster order in the input image 403 serving as the search range, and calculates the SAD value V(x, y) between the pixel pattern 405 of the partial region 404 and the template 402. The partial region 404 where the SAD value V(x, y) acquired by the calculation is a minimum is considered to be a partial region most similar to the template 402 in the input image 403 serving as the search region. The matching circuit 201 acquires coordinates (x, y) of the partial region 404 where the SAD value V(x, y) is the minimum in the input image 403. The coordinates (x, y) of the partial region 404 where the SAD value V(x, y) is the minimum are a position where it is highly likely that the object region to be tracked is located in the input image 403 serving as the search image. In the following description, the coordinates (x, y) of the partial region 404 where the SAD value V(x, y) is the minimum is referred to as the object tracking position. The matching circuit 201 extracts a region corresponding to the coordinates (x, y) of the partial region 404 where the SAD value V(x, y) is the minimum from the input image 403 serving as the search range, and outputs the extracted region as the estimated object region. The matching circuit 201 transmits the information about the object tracking position to the likelihood distribution generation circuit 204.

In the above description, the example using the information about the luminance value (one-dimensional information including only the luminance value) as the feature amount is provided, but, for example, three pieces of information about a brightness, a hue, and a color saturation (three-dimensional information including the brightness, the hue, and the color saturation) may be used as the feature amount. In the above-described example, the SAD value is described as the method for calculating the matching evaluation value, but a different calculation method, such as a so-called normalized correlation coefficient (NCC), may be used.

<Details of Feature Extraction Circuit of Object Tracking Circuit>

The details of the feature extraction processing performed by the feature extraction circuit 202 of the object tracking circuit 161 are described.

The feature extraction circuit 202 estimates the image region of the specific object (the object region) in the input image of the A+B image based on the position of the object region (the object tracking position) specified by the user or matched by the matching circuit 201, and the object likelihood distribution from the likelihood distribution generation circuit 204. The feature extraction circuit 202 extracts the feature amount of an image region near the coordinates of the object tracking position as the feature amount of the specific object region.

The feature extraction circuit 202 acquires a color histogram of the image region near the coordinates of the object tracking position as a color histogram Hin of the object region to be tracked. The feature extraction circuit 202 acquires a color histogram Hout of an image region near the object region. The feature extraction circuit 202 calculates an information amount I(a) expressed by the following equation (4) with use of the color histogram Hin and color histogram and Hout. The color histogram Hout of the image region near the object region is acquired from the entire input image of the A+B image or a partial region thereof.

$$I(a) = -\log_2 Hin(a)/Hout(a) \quad \text{Equation (4)}$$

The information amount I(a) in the equation (4) represents an occurrence probability of each bin of the color histogram in the object region with respect to the entire input image of the A+B image or the partial region thereof. The occurrence probability of each bin of the color histogram can also be an evaluation value of each bin. The feature extraction circuit 202 generates a map indicating a probability of being the pixel in the object region with respect to each of the pixels in the input image of the A+B image based on the information amount I(a).

The feature extraction circuit 202 acquires the object likelihood distribution generated by the likelihood distribution generation circuit 204 based on the distance information as described below, i.e., information about a map indicating a probability of being the object region. The feature extraction circuit 202 generates an object map indicating a probability of being the specific object region by multiplying the probability in the map based on the color histogram and the probability in the map based on the distance information (the object likelihood distribution). The feature extraction circuit 202 estimates the object region by fitting a rectangle indicating the object region to the input image of the A+B image based on the object map. As a result of the rectangle fitting processing, the estimated object region contains many pixels highly likely to be the object region and contains few pixels little likely to be the object region. The feature amount of the object region that is estimated by the feature extraction circuit 202 serves as the template to be used in the above-described matching by the matching circuit 201.

<Details of Distance Distribution Generation Circuit of Object Tracking Circuit>

The details of the processing for generating the distance distribution that is performed by the distance distribution generation circuit 203 of the object tracking circuit unit 161 will be described.

The distance distribution generation circuit 203 calculates the distance from the imaging apparatus 100 to the object or the like based on the above-described parallax images of the A image and the B image in association with each of the pixels in the input image of the A+B image. More specifically, the distance distribution generation circuit 203 detects an image displacement amount to calculate the distance of each of the pixels by performing correlation calculation processing using the parallax images. A method for detecting the image displacement amount using the parallax images is disclosed in, for example, Japanese Patent Application Laid-Open No. 2008-15754, and the technique discussed in the patent literature is to detect the image displacement amount by carrying out the correlation calculation for each small block obtained by dividing an image into small regions. The distance distribution generation circuit 203 calculates a deviation (a defocus amount) for each of the pixels on the imaging plane of the image sensor 141 by multiplying the image displacement amount by a predetermined conversion coefficient. In the present exemplary embodiment, the calculated defocus amount is treated as the estimated distance to the object or the like at each of the pixels in the input image of the A+B image, and the distance distribution generation circuit 203 generates a distribution in which each of these estimated distances is laid out in association with each of the pixels as the distance distribution.

The distance distribution generation circuit 203 determines, with respect to the distance information estimated for each of the pixels, reliability of the distance information, and generates a reliability distribution indicating a distribution of the reliability of the estimated distance for each of the pixels. An example of generating the reliability distribution is described. The distance distribution generation circuit 203 detects the image displacement amount for each of the pixels by dividing the parallax images of the A image and the B image into small regions (small blocks) and carrying out the correlation calculation for each of these small blocks as described above. In a case where a similarity of an image pattern is acquired by the correlation calculation, for example, with the image patterns of the individual small blocks are a collection of similar patterns, it is difficult to obtain a peak value of a degree of correlation by the correlation calculation, and to detect the correct image displacement amount. Therefore, the distance distribution generation circuit 203 determines that the reliability is low if a difference between an average value and the peak value (a maximum value in the case of the similarity) of the correlation calculation is small. The reliability is acquired for each of the small blocks. A position of each of pixels in the small block is expressed by coordinates, so that the distance distribution generation circuit 203 can generate the reliability distribution from the reliability of the distance information about each of the pixels. The distance distribution generation circuit 203 also transmits information about the reliability distribution with respect to the distance information about each of the pixels together with the information about the distance distribution to the likelihood distribution generation circuit 204.

<Details of Object Likelihood Distribution Generation Circuit of Object Tracking Circuit>

The details of the processing for generating the object likelihood distribution that is performed by the likelihood distribution generation circuit 204 of the object tracking circuit 161 is described below.

The likelihood distribution generation circuit 204 generates the object likelihood distribution indicating the probability of being the specific object region based on the information about the distance distribution and the reliability distribution received from the distance distribution generation circuit 203 and the information about the object region from the matching circuit 201. The object likelihood distribution is described with reference to FIGS. 5A to 5C.

Figure 5A:
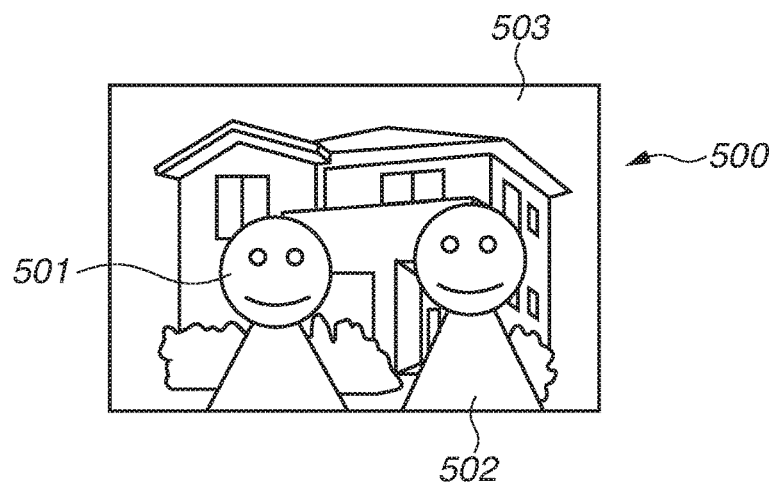
FIG. 5A illustrates one example of an input image of an A+B image and the object to be tracked.

FIG. 5A illustrates one example of an input image 500 of the A+B image and an object 501 to be tracked in the input image 500. There are also another object 502 different from the object 501 to be tracked and a background 503 in the input image 500 illustrated in FIG. 5A. In the example of the input image 500 illustrated in FIG. 5A, the objects 501 and 502 are objects located short distance away from the imaging apparatus 100, and the background 503 is located long distance away from the imaging apparatus 100.

Figure 5B:
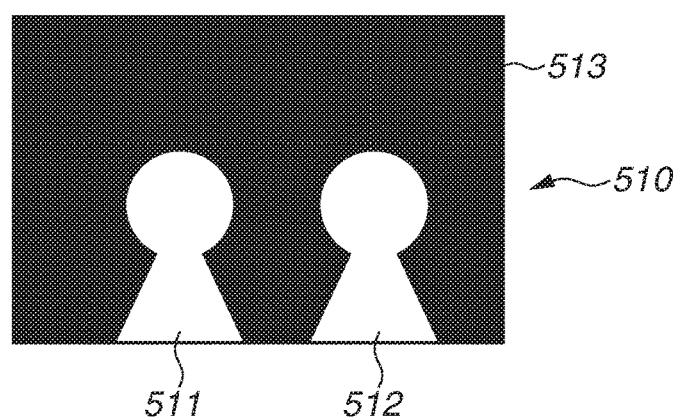
FIG. 5B illustrates a distance distribution.

FIG. 5B illustrates the distance distribution generated by the distance distribution generation circuit 203 from the input image 500 illustrated in FIG. 5A. In the case of the present exemplary embodiment, the distance distribution is expressed as, for example, a black-and-white binary image. In the image example of the distance distribution illustrated in FIG. 5B, a region formed of pixels expressed in a white color indicates the region of the object or the like located short distance away from the imaging apparatus 100, and a region formed of pixels expressed in a black color indicates a region of the object or the like located long distance away from the imaging apparatus 100. In the example illustrated in FIG. 5A, the distance from the imaging apparatus 100 to the objects 501 and 502 is short and the distance from the imaging apparatus 100 to the background 503 is long, so that the distance distribution of FIG. 5A is generated in such a manner that regions 511 and 512 respectively corresponding to the objects 501 and 502 are expressed as the white regions and a region 513 corresponding to the background 503 is expressed as the black region. The object 501 is set as the tracking target in the example illustrated in FIG. 5A, so that a position of the region 511 corresponding to the object 501 is set as the object tracking position in the case of the example illustrated in FIG. 5B. In the example illustrated in FIG. 5B, the distance distribution is expressed by the white and black binary values for simplification of the description, but is actually generated as multivalued information in which each of the pixels can indicate the distance.

Figure 5C:
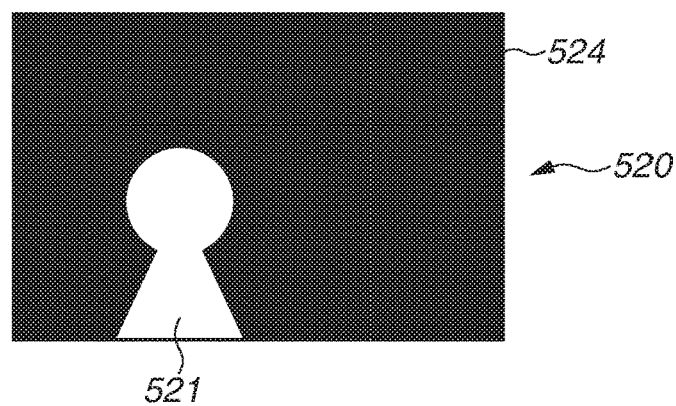
FIG. 5C illustrates one example of an object likelihood distribution.

FIG. 5C illustrates one example of an object likelihood distribution 520 to be generated by the likelihood distribution generation circuit 204 with use of the distance distribution 510 illustrated in FIG. 5B. In the example illustrated in FIG. 5C, each of pixels is expressed by white and black binary values in the object likelihood distribution 520. In the example of the object likelihood distribution 520 illustrated in FIG. 5C, a region formed of pixels expressed in a white color indicates a region having a high probability of being the object region to be tracked, and a region formed of pixels expressed in a black color indicates a region having a low probability of being the object region to be tracked. The likelihood distribution generation circuit 204 determines that the probability of being the object region to be tracked is high for a region defined by connecting each of pixels having a value of the distance information at each of the pixels in the distance distribution close to the value of the distance information corresponding to the object tracking position. More specifically, the likelihood distribution generation circuit 204 determines that the probability of being the object region to be tracked is high for a region defined by connecting each of pixels having, based on the object tracking position, a value close to the value of the distance information at the pixel at the position.

If the value of the distance information at each of the pixels in the distance distribution is a value far from the value of the distance information at each of the pixels in the object region to be tracked, the likelihood distribution generation circuit 204 determines that the probability of being a pixel in the object region to be tracked is low for the pixel. The likelihood distribution generation circuit 204 determines that the probability of being a pixel in the object region to be tracked is low for, based on the object tracking position, a pixel having a value close to the value of the distance information at the pixel at the position but located in a non-connected region (a disconnected region) as described below.

Whether the value is close to or far from the value of the distance information at each of the pixels in the object region to be tracked can be determined with use of a preset predetermined distance threshold value by way of example. For example, the value can be determined to be close if the value of the distance information is smaller than or equal to the distance threshold value, while the value can be determined to be far if the value of the distance information exceeds the distance threshold value. A connection or disconnection of the region based on the object tracking position is described below.

In the case of the example illustrated in FIG. 5C, a region 521 corresponding to the object 501 illustrated in FIG. 5A is the region formed of the pixels determined to have the high probability of being the object region to be tracked. A region 524 other than the region 521 is a region formed of the pixels determined to have the low probability of being the object region to be tracked. In the example illustrated in FIG. 5C, the object likelihood distribution is expressed by the white and black binary values for simplification of the description, but the probability of being the pixel in the object region to be tracked is actually expressed by multiple values in the case of the present exemplary embodiment. In this manner, the object likelihood distribution 520 illustrated in FIG. 5C is generated as a distribution in which the distance information at each of the pixels in the distance distribution 510 illustrated in FIG. 5B is converted into a value indicating the probability of being the object region to be tracked.

The likelihood distribution generation circuit 204 can determine whether to determine the object likelihood based on the reliability distribution information transmitted together with the distance distribution information from the distance distribution generation circuit 203. For example, the likelihood distribution generation circuit 204 may be configured to, if the reliability of the distance information at the pixel is determined to be low based on the reliability distribution information, refrain from determining the object likelihood with use of the distance information at the pixel. Because whether to determine the object likelihood can be set for each of the pixels, the likelihood distribution generation circuit 204 can determine the probability of the object region to be tracked as described above only with respect to a pixel having a high reliability. Whether the reliability is high or low can be determined with use of a preset reliability threshold value by way of example. For example, the likelihood distribution generation circuit 204 determines that the reliability is high if the value of the reliability of the reliability distribution information is equal to or higher than the predetermined reliability threshold value and determines that the reliability is low if the value of the reliability of the reliability distribution information is lower than the reliability threshold value so that whether to determine the object likelihood can be determined.

<Flow of Processing for Generating Object Likelihood Distribution>

A flow of the processing for generating the object likelihood distribution that is performed by the likelihood distribution generation circuit 204 is described with reference to FIGS. 6, and 7A and 7B. FIG. 6 is a flowchart illustrating a detailed flow of the above-described processing for generating the object likelihood distribution in step S303 illustrated in FIG. 3. Each of processing steps illustrated in the flowchart of FIG. 6 may be realized by, for example, the CPU 151 executing the program according to the present exemplary embodiment. FIGS. 7A and 7B are used for a description of classes in the object likelihood distribution in step S601 illustrated in FIG. 6.

In step S601 illustrated in the flowchart of FIG. 6, the likelihood distribution generation circuit 204 clusters each of the pixels in the distance distribution supplied from the distance distribution generation circuit 203 into four kinds of clusters like the following examples. The clustering is carried out according to the presence or absence of the distance information, the reliability of the distance information, and the value of the distance information as illustrated in FIG. 7A. As illustrated in FIG. 7A, the likelihood distribution generation circuit 204 classifies a pixel in the distance distribution into a first class if the pixel has the distance information, the reliability of the distance information is high, and the value of the distance information is close to the value of the distance information at the pixel at the objet tracking position. In the present exemplary embodiment, the first class is referred to as a positive class. The likelihood distribution generation circuit 204 classifies a pixel in the distance distribution into a second class if the pixel has the distance information, the reliability of the distance information is high, and the value of the distance information is far from the value of the distance information at the pixel at the object tracking position. In the present exemplary embodiment, the second class is referred to as a negative class. The likelihood distribution generation circuit 204 classifies a pixel in the distance distribution into a third class without relying on the value of the distance information thereof if the pixel has the distance information and the reliability of the distance information is low. In the present exemplary embodiment, the third class is referred to as an unknown class. The likelihood distribution generation circuit 204 classifies a pixel in the distance distribution into a fourth class if the pixel does not have the distance information. In the present exemplary embodiment, the fourth class is referred to as a non-value class. The distance distribution generation circuit 203 may acquire the distance information only with respect to a partial region of the input image of the A+B image to reduce a processing load. In this case, the likelihood distribution generation circuit 204 classifies a pixel corresponding to another region excluding the partial region into the non-value class since the pixel does not have the distance information. After step S601, the processing proceeds to step S602.

In step S602, the likelihood distribution generation circuit 204 labels pixels in the positive class and the unknown class as pixels to be connected based on the object tracking position. By the labeling, the likelihood distribution generation circuit 204 connects the pixels in the positive class and the unknown class and does not connect the pixels in the negative class and the non-value class based on the object tracking position. After step S602, the processing proceeds to step S603.

In step S603, the likelihood distribution generation circuit 204 converts the positive class and the unknown class of unlabeled pixels that have not been labeled in step S602 into the negative class. The likelihood distribution generation circuit 204 does not convert a class of the pixels labeled in step S602. In the present exemplary embodiment, the object to be tracked is assumed to be located substantially constant distance away from the imaging apparatus 100 and also be an object or the like that is a single body. After step S603, the processing proceeds to step S604.

In step S604, the likelihood distribution generation circuit 204 determines a class of a closest pixel belonging to a class other than the non-value class to the pixel in the non-value class. The likelihood distribution generation circuit 204 converts the class of the pixel in the non-value class into the negative class if the class of the closest pixel is the negative class. After step S604, the processing proceeds to step S605.

In step S605, the likelihood distribution generation circuit 204 determines a class of a closest pixel belonging to a class other than the non-value class to the pixel in the non-value class. The likelihood distribution generation circuit 204 converts the class of the pixel in the non-value class into the unknown class if the class of the closest pixel is the positive class or the unknown class. After the processing in step S605, the likelihood distribution generation circuit 204 ends the processing illustrated in the flowchart of FIG. 6.

As described above, in the present exemplary embodiment, each of the pixels in the object likelihood distribution is classified into any of at least three kinds of classes, the positive class, the negative class, and the unknown class. FIG. 7B illustrates the classes in the object likelihood distribution and the definition of each of the classes. As illustrated in FIG. 7B, the positive class is a class indicating that the probability of the object region to be tracked is high. The negative class is a class indicating that the probability of the object region to be tracked is low. The unknown class is a class indicating that the probability of the object region to be tracked cannot be determined.

<Effect as Object Tracking>

The information about the object likelihood distribution generated by the likelihood distribution generation circuit 204 in the above-described manner is transmitted to the feature extraction circuit 202 and is used to estimate the object region by the feature extraction circuit 202. More specifically, the feature extraction circuit 202 multiplies the probability indicating how likely the region is the object region based on the histogram of the color information by the probability indicating how likely the region is the object region based on the distance information (i.e., the probability indicated by the object likelihood distribution) as described above. As a result of the multiplication, the object map indicating the probability of being the specific object region is generated.

For example, if the object region is estimated based on only the color information and there is a differently colored small region in the object region, the small region may be incorrectly determined as not the object region. In the case of the present exemplary embodiment, the positive class (the class indicating that the probability of being the object is high) in the object likelihood distribution is used to estimate the object region, which can prevent the differently colored small region from being incorrectly determined as not the object region.

For example, if the object region is estimated based on only the color information and there is a region in a color similar to the color of the object region around the object region, the region around the object region may be incorrectly determined as contained in the object region. In the case of the present exemplary embodiment, the negative class (the class indicating that the probability of being the object is low) in the object likelihood distribution is used to estimate the object region, which can prevent such an incorrect determination that the region in the similar color around the object region is contained in the object region.

For example, in a case where the object region is estimated based on only the distance information, a region, about which it is unknown whether the region is the tracking target although the distance of the region is similar to that of the object region to be tracked, may be incorrectly determined as the object region to be tracked. In the case of the present exemplary embodiment, with respect to the region belonging to the unknown class (the class indicating that the probability of being the object cannot be determined) in the object likelihood distribution, about which it is unknown whether the region is the tracking target, whether the region is the object region to be tracked can be determined by referring to the color information. However, in this case, whether the region is the object region to be tracked is determined less accurately.

<Flow of Processing by Imaging Apparatus>

FIG. 8 is a flowchart illustrating a flow of entire processing performed by the imaging apparatus 100 according to the present exemplary embodiment for tracking the object like the above-described example when capturing an image.

In step S801 illustrated in the flowchart of FIG. 8, the CPU 151 determines a state of the imaging apparatus 100. More specifically, if the CPU 151 determines that an imaging switch of the operation switch 156 of the imaging apparatus 100 is in an ON state in step S801 (YES in step S801), the processing proceeds to step S802. If the CPU 151 determines that the imaging switch is in an OFF state in step S801 (NO in step S801), the CPU 151 ends the processing illustrated in the flowchart of FIG. 8.

In step S802, the CPU 151 controls the units of the imaging apparatus 100 to cause the units to perform processing steps required for the imaging. After step S802, the processing proceeds to step S803.

In step S803, the CPU 151 controls the object tracking circuit 161 to cause the object tracking circuit 161 to perform the processing for tracking the object according to the present exemplary embodiment described with reference to the above-described drawings, FIGS. 3 to 7A and 7B and the like. After step S803, the processing proceeds to step S804.

In step S804, the CPU 151 controls the focus control circuit 133 to cause the focus control circuit 133 to perform focus detection processing on the object corresponding to the object region being tracked by the object tracking circuit 161. In other words, the focus control circuit 133 at this time calculates the shift amount (the defocus amount) in the focusing direction with respect to the object to be tracked from the parallax images of the A image and the B image. After step S804, the processing proceeds to step S805.

In step S805, the focus control circuit 133 performs the AF control of focusing on the object to be tracked by driving the focus lens 131 of the lens unit 101 based on the shift amount acquired in step S804. After step S805, the processing returns to step S801. In step S801, if the imaging switch is in the ON state (YES in step S801), the imaging apparatus 100 continuously performs the processing in steps S802 to S805.

As described above, the imaging apparatus 100 according to the present exemplary embodiment generates the object likelihood distribution effective for the object tracking from the distance distribution based on the distance information and the information about the object tracking position, and tracks the object region based on the object likelihood distribution. As a result, according to the present exemplary embodiment, the specific object region can be tracked with high accuracy.

<Another Exemplary Embodiment>

In the above-described exemplary embodiment, the example in which the imaging apparatus 100 is equipped with the object tracking function is provided, but the apparatus that performs the object tracking processing according to the present exemplary embodiment is not limited to the imaging apparatus. Examples of apparatuses that may be equipped with the object tracking function include a display apparatus that generates a display image from image data supplied from an external apparatus or read out from a recording medium or the like and displays the generated image on a screen. In this case, the image data input to the display apparatus serves as the above-described image data of the A+B image and parallax image data including the A image and the B image. In the example, a control circuit, such as a microcontroller, mounted on the display apparatus controls a display condition for displaying the image based on the information about the object region extracted in the object tracking processing (for example, a position and a size of the object region in the image). More specifically, an image, such as a frame image, indicating the object is, for example, displayed while being superimposed at the position of the object region in the image.

Further, the display apparatus may extract the feature amount with use of the distance information, and may change the display condition when displaying the information indicating the object in the superimposed manner before and after extracting the feature amount with use of the distance information. For example, the accuracy with which the region of the object is estimated is low before the feature amount is extracted with use of the distance information, while the accuracy with which the region of the object is estimated increases after the feature amount is extracted with use of the distance information. For this reason, the display apparatus can perform display control of displaying a predetermined fixed frame in the superimposed manner before extracting the feature amount with use of the distance information while dynamically changing a position and/or a size of the frame relative to the object region detected by the object tracking after extracting the feature amount with use of the distance information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-123608, filed Jun. 22, 2016, which is hereby incorporated by reference herein in its entirety.

What is claimed is:

1. An image processing apparatus comprising:
   at least one processor;
   at least one nonvolatile memory device;
   an acquisition unit configured to acquire distance information indicating a distance of each of regions in first image data;
   a generation unit configured to generate a likelihood distribution of an object in the first image data; and
   a calculation unit configured to calculate a feature amount to be used to detect the object from second image data based on the likelihood distribution,
   wherein the acquisition unit, the generation unit, and the calculation unit is realized by execution of a program stored in the at least one nonvolatile memory device by the at least one processor, and
   wherein the generation unit generates the likelihood distribution by classifying the distance information in the first image data into a plurality of classes based on a difference in the distance information from a region containing a position specified as the object, and reliability of the distance information.

2. The image processing apparatus according to claim 1, wherein the calculation unit extracts a feature amount of each of the regions in the first image data and determines the feature amount to be used to detect the object based on the feature amount of each of the regions and the likelihood distribution.

3. The image processing apparatus according to claim 1, wherein the calculation unit sets a coefficient according to the likelihood distribution to each of the regions and determines the feature amount to be used to detect the object with use of an evaluation value of the feature amount and the coefficient for each of the regions.

4. The image processing apparatus according to claim 3, wherein the likelihood distribution contains a first region where the object highly likely exists, a second region where the object little likely exists, and a third region that is neither the first region nor the second region.

5. The image processing apparatus according to claim 1, wherein the acquisition unit calculates a defocus amount of each of the regions from a plurality of pieces of image data corresponding to the first image data and having a parallax, and acquires the distance information from the defocus amount of each of the regions.

6. The image processing apparatus according to claim 5, wherein the acquisition unit generates information indicating the reliability of the distance information about each of the regions from the plurality of pieces of image data having the parallax.

7. The image processing apparatus according to claim 1, wherein the likelihood distribution contains at least a first region and a second region,
and
wherein the first region includes:
(a) a region containing the position specified as the object,
(b) a region where the reliability of the distance information is equal to or higher than a reliability threshold value and a difference in the distance information from the region containing the position specified as the object is equal to or smaller than a distance threshold value, the region being connected to the region containing the position specified as the object, and
(c) a region where the reliability of the distance information is lower than the reliability threshold value, the region being connected to the region containing the position specified as the object.

8. An image processing apparatus comprising:
at least one processor;
at least one nonvolatile memory device;
an acquisition unit configured to calculate a defocus amount of each of regions in first image data from a plurality of pieces of image data corresponding to the first image data and having a parallax, and acquire distance information from the defocus amount of each of the regions;
a generation unit configured to generate a likelihood distribution of an object in the first image data; and
a calculation unit configured to calculate a feature amount to be used to detect the object from second image data based on the likelihood distribution,
wherein the acquisition unit, the generation unit, and the calculation unit is realized by execution of a program stored in the at least one nonvolatile memory device by the at least one processor,
wherein the generation unit generates the likelihood distribution by classifying the distance information in the first image data into a plurality of classes based on a difference in the distance information from a region containing a position specified as the object, and reliability of the distance information.

9. An imaging apparatus comprising:
at least one processor;
at least one nonvolatile memory device;
an image sensor configured to generate image data;
an acquisition unit configured to acquire distance information indicating a distance of each of regions in first image data;
a generation unit configured to generate a likelihood distribution of an object in the first image data;
a calculation unit configured to calculate a feature amount to be used to detect the object from second image data based on the likelihood distribution;
a detection unit configured to detect the object from the second image data with use of the feature amount calculated by the calculation unit; and
a control unit configured to control an imaging condition when the image senor captures an image according to information about an image region corresponding to the object detected by the detection unit,
wherein the acquisition unit, the generation unit, the calculation unit, the detection unit, and the control unit is realized by execution of a program stored in the at least one nonvolatile memory device by the at least one processor,
wherein the generation unit generates the likelihood distribution by classifying the distance information in the first image data into a plurality of classes based on a difference in the distance information from a region containing a position specified as the object, and reliability of the distance information.

10. An imaging apparatus comprising:
at least one processor;
at least one nonvolatile memory device;
an image sensor configured to generate image data;
an acquisition unit configured to calculate a defocus amount of each of regions in first image data from a plurality of pieces of image data corresponding to the first image data and having a parallax, and acquire distance information from the defocus amount of each of the regions;
a generation unit configured to generate a likelihood distribution of an object in the first image data;
a calculation unit configured to calculate a feature amount to be used to detect the object from second image data based on the likelihood distribution;
a detection unit configured to detect the object from the second image data with use of the feature amount calculated by the calculation unit; and
a control unit configured to control an imaging condition when the image sensor captures an image according to information about an image region corresponding to the object detected by the detection unit,
wherein the acquisition unit, the generation unit, the calculation unit, the detection unit, and the control unit is realized by execution of a program stored in the at least one nonvolatile memory device by the at least one processor,
wherein the generation unit generates the likelihood distribution by classifying the distance information in the first image data into a plurality of classes based on a difference in the distance information from a region containing a position specified as the object, and reliability of the distance information.

11. An image processing method comprising:
acquiring distance information indicating a distance of each of regions in first image data;
generating a likelihood distribution of an object in the first image data; and
calculating a feature amount to be used to detect the object from second image data based on the likelihood distribution,
wherein the likelihood distribution is generated by classifying the distance information in the first image data into a plurality of classes based on a difference in the distance information from a region containing a position specified as the object, and reliability of the distance information.

12. An image processing method comprising:

calculating a defocus amount of each of regions in first image data from a plurality of pieces of image data corresponding to the first image data and having a parallax, and acquiring distance information from the defocus amount of each of the regions;

generating a likelihood distribution of an object in the first image data; and calculating a feature amount to be used to detect the object from second image data based on the likelihood distribution, wherein the likelihood distribution is generated by classifying the distance information in the first image data into a plurality of classes based on a difference in the distance information from a region containing a position specified as the object, and reliability of the distance information.

13. A non-transitory computer-readable nonvolatile storage medium storing a program for controlling an image processing apparatus, the program including codes for causing execution of:

acquiring distance information indicating a distance of each of regions in first image data;

generating a likelihood distribution of an object in the first image data; and calculating a feature amount to be used to detect the object from second image data based on the likelihood distribution, wherein the likelihood distribution is generated by classifying the distance information in the first image data into a plurality of classes based on a difference in the distance information from a region containing a position specified as the object, and reliability of the distance information.

14. A non-transitory computer-readable nonvolatile storage medium storing a program for controlling an image processing apparatus, the program including codes for causing execution of:

calculating a defocus amount of each of regions in first image data from a plurality of pieces of image data corresponding to the first image data and having a parallax, and acquiring distance information from the defocus amount of each of the regions;

generating a likelihood distribution of an object in the first image data; and calculating a feature amount to be used to detect the object from second image data based on the likelihood distribution, wherein the likelihood distribution is generated by classifying the distance information in the first image data into a plurality of classes based on a difference in the distance information from a region containing a position specified as the object, and reliability of the distance information.

\* \* \* \* \*